United States Patent
Kirchberger et al.

(10) Patent No.: US 6,301,542 B1
(45) Date of Patent: Oct. 9, 2001

(54) CRUISE CONTROL SYSTEM FOR VEHICLES, IN PARTICULAR FOR MOTOR VEHICLES

(75) Inventors: Andreas Kirchberger, Sinzing; Rainer Mosner, Überlingen, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/571,485

(22) Filed: May 15, 2000

Related U.S. Application Data

(63) Continuation of application No. PCT/DE98/03343, filed on Nov. 13, 1998.

(30) Foreign Application Priority Data

Nov. 13, 1997 (DE) .............................. 197 50 338

(51) Int. Cl.$^7$ .................................. B60K 31/00
(52) U.S. Cl. ................. 701/93; 701/96; 340/903
(58) Field of Search .................. 701/93, 96, 116, 701/301; 340/435, 436, 903

(56) References Cited

U.S. PATENT DOCUMENTS

| | | | |
|---|---|---|---|
| 5,510,990 | * 4/1996 | Hibino et al. | 701/96 |
| 5,572,428 | * 11/1996 | Ishida et al. | 701/301 |
| 5,572,449 | * 11/1996 | Tang et al. | 364/528.39 |
| 5,629,851 | * 5/1997 | Williams et al. | 701/96 |
| 5,699,040 | * 12/1997 | Matsuda | 340/435 |
| 5,929,803 | * 7/1999 | Uehara et al. | 342/70 |
| 5,934,399 | * 8/1999 | Iiboshi et al. | 180/169 |
| 5,955,967 | * 9/1999 | Yamada | 340/904 |
| 5,964,822 | * 10/1999 | Alland et al. | 701/301 |
| 6,009,368 | * 12/1999 | Labuhn et al. | 701/96 |
| 6,026,347 | * 2/2000 | Schuster | 701/301 |
| 6,044,321 | * 3/2000 | Nakamura et al. | 701/96 |
| 6,055,467 | * 4/2000 | Mehring et al. | 701/23 |
| 6,081,762 | * 6/2000 | Richardson et al. | 701/93 |

FOREIGN PATENT DOCUMENTS

| | | |
|---|---|---|
| 4341689A1 | 6/1994 | (DE) . |
| 19614061A1 | 10/1996 | (DE) . |
| 19523111A1 | 1/1997 | (DE) . |
| 0441522A1 | 8/1991 | (EP) . |

OTHER PUBLICATIONS

Hoess, "Realisation of an Intelligent Cruise Control System Utilizing Classification of Distance, Relative Speed and Vehicle Speed Information" Proceedings of the Intelligent Vehicles '94 Symposium, 1994.*

Björnberg, "Autonomous intelligent cruise control", IEEE 44th Vehicular Technology Conference, 1994.*

Winner et al., "Adaptive Cruise Control System Aspects and Development Trends" SAE International Congress and Exposition, 1996.*

* cited by examiner

*Primary Examiner*—Michael J. Zanelli
*Assistant Examiner*—Eric M Gibson
(74) *Attorney, Agent, or Firm*—Herbert L. Lerner; Laurence A. Greenberg; Werner H. Stemer

(57) ABSTRACT

A cruise control system with a sensor device and an evaluation unit. The sensor device determines movement data and position data of an object. The evaluation unit processes the movement and the position data of the object and data on the movement of the motor vehicle itself. The velocity and/or a direction of travel of the vehicle are regulated as a function of the data. A tracking probability P is determined which is a measure of a control-related quality of the detection of the object. The velocity and/or direction of travel of the vehicle are regulated as a function of the tracking probability.

11 Claims, 3 Drawing Sheets

CRUISE CONTROL SYSTEM FOR VEHICLES, IN PARTICULAR FOR MOTOR VEHICLES

CROSS-REFERENCE TO RELATED APPLICATION

This is a continuation of copending International Application PCT/DE98/03343, filed Nov. 13, 1998, which designated the United States.

BACKGROUND OF THE INVENTION

Field of the Invention

The invention relates to a cruise control system for vehicles, in particular for motor vehicles.

The automatic control of vehicles is a goal worth striving for. In this field, adaptive cruise control (ACC) is playing an increasingly significant role because it permits the automatically controlled vehicle to react to obstacles and/or moving objects that may be encountered. In conventional ACC systems a sensor is provided which determines a distance and a velocity of an object located in a sensing range of the sensor. The distance data and the velocity data relating to the detected object are used to regulate the velocity of the vehicle only if the detected object is unambiguously identified as being located in a path of the vehicle.

A cruise control system that operates in this way has the disadvantage that the way in which the vehicle is controlled by the cruise control system is unsteady and unpleasant for passengers.

Published, Non-Prosecuted German Patent Application DE 196 14 061 A1 discloses a cruise control system for motor vehicles in which the probability of any object determined by the sensor device to be on the same path is determined and a target vehicle traveling ahead, from which target vehicle a constant distance is to be maintained, is selected as a function of the probability of traveling on the same path. The probability of traveling on the same path is dependent here on the size and the severity of a bend and on the relative position and the relative speed of a sensed object with respect to the system vehicle.

SUMMARY OF THE INVENTION

It is accordingly an object of the invention to provide a cruise control system for vehicles, in particular for motor vehicles, which overcomes the above-mentioned disadvantages of the prior art devices of this general type, which ensures that a vehicle is controlled in a uniform and steady way.

With the foregoing and other objects in view there is provided, in accordance with the invention, a cruise control system for vehicles, including motor vehicles, containing:

a sensor device for determining movement data and position data of an object located in a sensing range of the sensor device; and an evaluation unit connected to the sensor device, the evaluation unit receiving and processing the movement data and the position data of the object determined by the sensor device and further receiving and processing vehicle data on a movement of a vehicle, the evaluation unit regulating at least one of a velocity and a direction of travel of the vehicle in dependence on the movement data, the position data and the vehicle data, the evaluation unit determining a tracking probability P which is a measure of a control-related quality of a detection of the object, the velocity and the direction of travel of the vehicle being regulated in dependence on the tracking probability P such that as the tracking probability P rises a degree of control being intensified.

The solution according to the invention has the advantage that the automatically controlled vehicle is accelerated or decelerated uniformly. Severe deceleration or braking processes are initiated only to the degree to which it is certain that the vehicle is located on a collision course with another object. By changing the velocity of the vehicle as a function of the tracking probability, a more rapid reaction to objects is achieved and reaction to incorrect objectives that are detected is attenuated or avoided.

The velocity and/or direction of travel of the vehicle are regulated as a function of the tracking probability P in such a way that as P rises the degree of control is preferably intensified. This can be carried out by a number of intermediate stages or by a regulating function which rises continuously as P increases.

In accordance with an added feature of the invention, the movement data and the position data determined via the sensor device relate to at least one of a distance between the object and the vehicle, a relative velocity of the object with respect to the vehicle, and an angle between the direction of travel of the vehicle and the direction of travel of the vehicle with respect to the object.

In accordance with an additional feature of the invention, the vehicle data relates to at least one of the velocity of the vehicle, a yaw velocity of the vehicle, and a lateral acceleration of the vehicle.

In accordance with another feature of the invention, the vehicle has an engine, a transmission and a brake system and the velocity of the vehicle is regulated by controlling an operation of at least one of the engine, the transmission and the brake system.

In accordance with another added feature of the invention, the tracking probability P depends on at least one of the following variables:

variable $f_T$ being a number of measurement cycles passed through since a detection of the object, variable $f_A$ being a stability of a sensor signal reflected by the object, variable $f_D$ being a quality of a distance determined from the vehicle to the object, variable $f_V$ being a quality of a relative velocity determined between the vehicle and the object, variable $f_W$ being a quality of an angle determined between the direction of travel of the vehicle and the direction of travel of the vehicle with respect to the object, and variable $f_P$ being a probability of the object being located in a path of the vehicle.

In accordance with another additional feature of the invention, the variable $f_T$ is a number that is increased if an observed object detected in a current measurement cycle is assigned to the object which has already been pursued.

In accordance with further features of the invention, the variable $f_A$ is greater the smaller the fluctuations of sensor measurement signals of the object are between successive measurement cycles. The variable $f_D$ is greater the smaller a deviation between the distance determined from the object and a distance which is to be expected in terms of criteria due to dynamics of vehicle movement. The variable $f_V$ is greater the smaller a deviation between the relative velocity determined between the vehicle and the object and a relative velocity which is to be expected in terms of criteria of dynamics of vehicle movement. The variable $f_W$ is greater the smaller a deviation between a first angle determined between the direction of travel of the vehicle and a direction of the vehicle with respect to the object and a second angle which is to be expected in terms of criteria of dynamics of vehicle movement. The variable $f_P$ is a location probability and is determined by a current angle between the direction of travel of the vehicle and the direction of travel of the vehicle with respect to the object, a path of the vehicle and an expected path of the object, and the variable $f_P$ is greater the greater an associated probability.

In accordance with a concomitant feature of the invention, the tracking probability P is determined by the equation:

$$P = w_T * f_T + w_A * f_A + w_D * f_D + w_V * f_V + w_W * f_W + w_P * f_P,$$

where $w_T$, $w_A$, $w_D$, $w_V$, $w_W$ and $w_P$ are weighting factors resulting from a relative significance of a quality of an individual measurement results.

Other features which are considered as characteristic for the invention are set forth in the appended claims.

Although the invention is illustrated and described herein as embodied in a cruise control system for vehicles, in particular for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
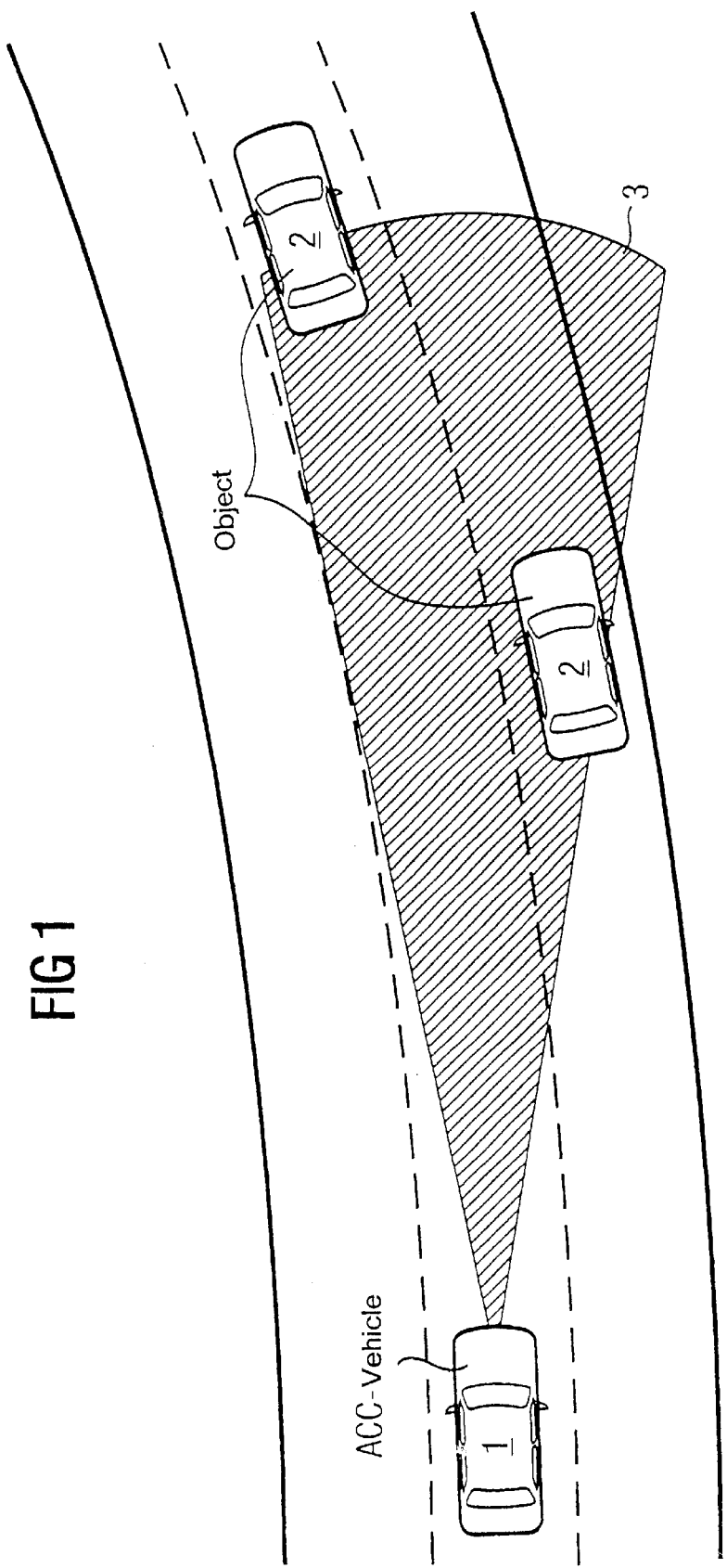
FIG. 1 a schematic representation of an application of a cruise control system according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown a vehicle 1 in road traffic, having an adaptive cruise control system 10. In order to regulate the cruising of the vehicle 1 automatically, objects 2 which are possibly located in a path of the vehicle 1 are sensed and a velocity of the vehicle 1 is appropriately adapted.

Figure 2:
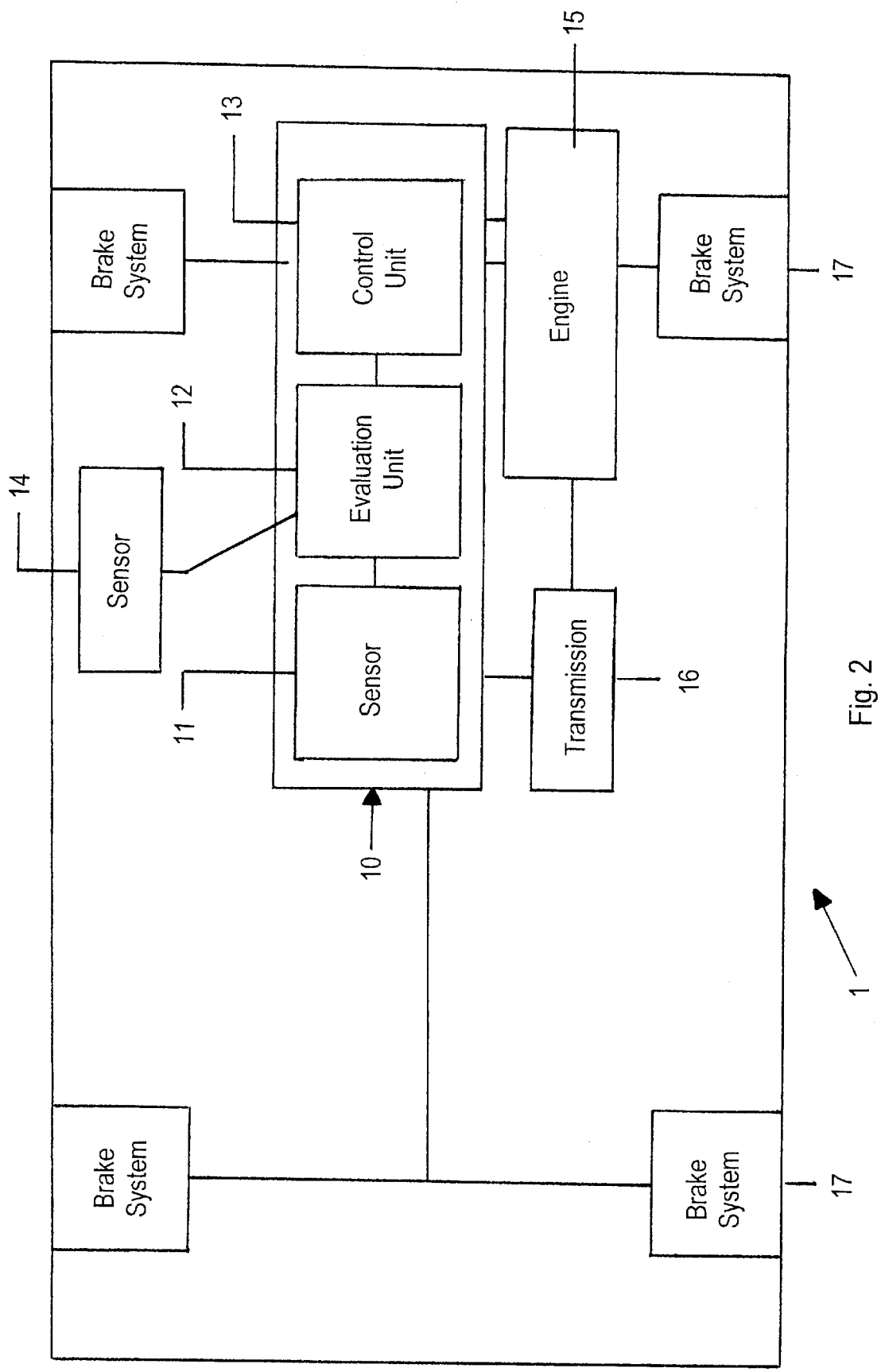
FIG. 2 is a block diagram of an adaptive cruise control system disposed in a motor vehicle.

The cruise control system 10 has a sensor device 11, an evaluation unit 12 and a control unit 13 for changing the velocity/direction of travel (FIG. 2).

Movement data and position data of an object 2 located in the sensing range 3 of the sensor device 11 are determined in the sensor device 11. In particular, a distance between the vehicle 1 and the object 2 and a relative velocity between the vehicle 1 and the object 2 are determined. Furthermore, an angle between a direction of movement of the vehicle 1 and a direction of the vehicle 1 with respect to the object 2 is determined.

Of course, it is also possible for the sensor device 11 to sense a plurality of objects 2, as shown in FIG. 1, and to determine separately the data that are respectively associated with each of the objects 2. The object data are determined by the sensor device 11 in measurement cycles. As a result, the observation of more complex processes that can be varied over time is made possible.

In order to determine the respective object data, i.e. distance, relative velocity and angle, the sensor device 11 can be a radar sensor 11, for example a three-beam radar sensor. Further details are described in the reference titled "Longitudinal Autonomous Vehicle Control Utilizing Access to Conventional Cruise Control, Automatic Transmission and Brakes" by Alfred Höss in Sae Symposium Proceedings, Detroit, USA, 1995.

The data that are determined by the sensor device 11 are transmitted to the evaluation unit 12. The evaluation unit 12 processes the data and the data on a movement of the vehicle 1 itself and transmits appropriate signals to the control unit 13 for changing the velocity/direction of travel. The movement of the vehicle 1 itself can be determined by the sensor device 11 or by a specific vehicle sensor unit 14 having at least one sensor.

The data on the movement of the vehicle itself contains the velocity of the vehicle 1. In order to sense a position of the vehicle 1 on a bend, the sensor device 11 provides a combination of data signals including yaw rate sensor signals and/or wheel sensor signals and/or steering angle sensor signals and/or CAN bus data to be evaluated. In addition, a lateral acceleration of the vehicle 1 is also sensed.

In order to evaluate further the movement and the position data of the object 2 and of the data on the movement of the vehicle 1 itself, a tracking probability P is determined which is a measure of the control-related quality of the detection of the object 2, and a change in the velocity of the vehicle 1 has to be performed as a function of the tracking probability P. If the tracking probability P is standardized to the interval 0 to 1, no measures to change the velocity are performed when P=0, and measures to change the velocity, as performed in the cruise control system according to the prior art, are performed when P=1. P=1 thus corresponds to the unambiguous assignment of the object 2 as being located on a collision course with the vehicle 1. If P assumes a value >0 and <1, measures to change the travel characteristics are performed only in an appropriately attenuated fashion. The velocity and/or the direction of travel of the vehicle 1 are regulated as a function of the tracking probability P in such a way that the degree of control is preferably intensified as P rises. This can be carried out by a number of intermediate steps or by a control function that rises continuously as P increases.

The tracking probability P depends on all the variables that are determined by the sensor device 11 or by the vehicle-internal data signal transmitters in a way that is subject to related measurement and/or processing inaccuracies. In this respect, P depends functionally, inter alia, on $f_T$, $f_A$, $f_D$, $f_V$, $f_W$ and $f_P$, as now defined.

$f_T$ is a measure of a number of measurement cycles since the first object detection. After each measurement cycle, attempts are made to assign the objects 2 detected in the current measurement cycle to the objects 2 that have already been pursued. For each pursued object, a counter is run, which increases when there is a successful assignment. The higher the counter, the more reliable the detection of the object 2 and the greater the associated evaluation factor $f_T$.

$f_A$ stands for the stability of the signal reflected by the object. The current measurement signal of the object 2 is compared with those from preceding cycles. The smaller the fluctuations of the measurement signals, the greater the associated evaluation factor $f_A$.

$f_D$ is a measure of a quality of the distance determined between the vehicle 1 and the object 2. Here, a deviation between the distance determined from the object 2 and the distance that is to be expected in terms of criteria of the dynamics of vehicle movement is determined. The variables, for example the distance from the object 2, which are calculated in advance using a vehicle model are compared with the variables that are actually measured. The smaller the deviation, the greater the associated evaluation factor $f_D$.

$f_V$ is a measure of a quality of the velocity determined, and $f_W$ is a measure of the quality of the angle determined. Both are determined in a way analogous with $f_D$.

$f_P$ is a measure of a probability of the observed object 2 being located in the path of the vehicle 1. The location probability is determined by use of the current object angle, the path of the vehicle 1 and the expected path of the object 2. The higher the location probability, the greater the associated evaluation factor $f_P$. This factor is important for the evaluation of cutting-in maneuvers.

Because the functional dependence of the tracking probability P on the evaluation factors f is complicated and is essentially unknown, in a first approximation a linear relationship is assumed. In this respect, the tracking probability P is determined by the equation:

$$P = w_T * f_T + w_A * f_A + w_D * f_D + w_V * f_V + w_W * f_W + w_P * f_P,$$

where $w_T$, $w_A$, $w_D$, $w_V$, $w_W$ and $w_P$ are weighting factors which are to be determined. The weighting factors are determined or defined empirically by the person skilled in the art. Here, the concrete knowledge of the person skilled in the art of the precision of the measurement of the sensor device 11 and of the data on the movement of the vehicle 1 itself are taken into account. If it is known, for example, that the radar sensor 11 is very suitable for measuring velocity but that the distance values which are determined are subject to a high degree of impression (for example pulse radar), the person skilled in the art can weight the associated evaluation factors f appropriately.

Figure 3:
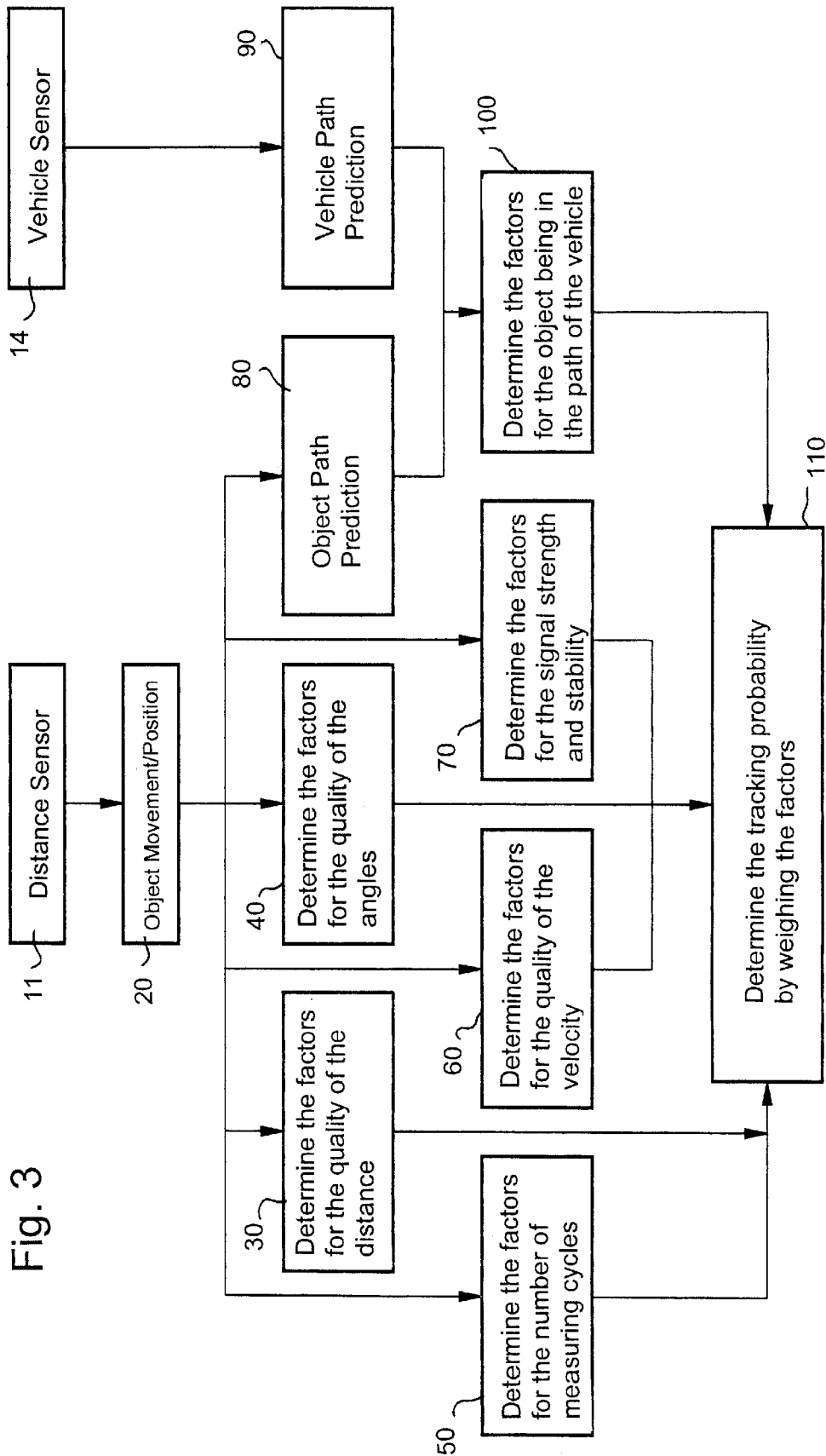
FIG. 3 is a block diagram showing how the tracking probability is determined.

The way in which the tracking probability P is determined is represented graphically in the flowchart in FIG. 3. The distance sensor 11 shown in FIG. 3 determines the movement/position data of the object 2, step 20. The vehicle sensor(s) 14 supplies the data on the movement of the vehicle 1 itself. After the assignment of the distance sensor data to the object 2, the evaluation factors $f_D$, $f_W$, $f_T$, $f_V$ and $f_A$ are determined, steps 30, 40, 50, 60 and 70 respectively. In order to determine the evaluation factor $f_P$, both the distance sensor data and the vehicle sensor data are used, the data being processed initially to form a path prediction of the object 2, step 80, and of a path prediction of the vehicle 1, step 90. The evaluation factor $f_P$ is determined from these data, step 100. The tracking probability P is then determined by functional logic operations performed on the evaluation factors f, step 110.

The control unit 13 for changing the velocity/direction of travel is controlled by an output signal of the evaluation unit 12. The control unit 13 for changing the velocity/direction of travel can control functions of an engine 15, a transmission 16, also including automatic transmission, and a braking system 17 of the vehicle 1. If the velocity of the vehicle 1 is to be reduced, depending on the time period remaining until a possible collision with object 2, a fuel supply is reduced, combined with moving down the gears, or braking torque is increased. If the velocity is to be increased again to a predefined travel velocity after a deceleration process, the fuel supply is appropriately increased and a higher gear is selected in the transmission.

The tracking probability P can also be used to regulate the direction of travel of the vehicle 1. For this purpose, the person skilled in the art can make use of already existing systems and implement a direction of travel control in them in a way which is analogous with the velocity control described above, the tracking probability P being a measure of the intensity of control operations which are performed in the control of the direction of travel.

We claim:

1. A cruise control system for vehicles, including motor vehicles, comprising:

a sensor device for determining movement data and position data of an object located in a sensing range of said sensor device; and an evaluation unit connected to said sensor device, said evaluation unit receiving and processing the movement data and the position data of the object determined by said sensor device and further receiving and processing vehicle data on a movement of a vehicle, said evaluation unit regulating at least one of a velocity and a direction of travel of the vehicle in dependence on the movement data, the position data and the vehicle data, said evaluation unit determining a tracking probability P being a measure of a control-related quality of a detection of the object, the velocity and the direction of travel of the vehicle being regulated in dependence on the tracking probability P such that as the tracking probability P rises a degree of control being intensified, the tracking probability P depending on at least one of the following variables:

variable $f_T$ being a number of measurement cycles passed through since a detection of the object;

variable $f_A$ being a stability of a sensor signal reflected by the object;

variable $f_D$ being a quality of a distance determined from the vehicle to the object;

variable $f_V$ being a quality of a relative velocity determined between the vehicle and the object;

variable $f_W$ being a quality of an angle determined between the direction of travel of the vehicle and the direction of travel of the vehicle with respect to the object; and variable $f_P$ being a probability of the object being located in a path of the vehicle.

2. The cruise control system according to claim 1, wherein the movement data and the position data determined via said sensor device relate to at least one of a distance between the object and the vehicle, a relative velocity of the object with respect to the vehicle, and an angle between the direction of travel of the vehicle and the direction of travel of the vehicle with respect to the object.

3. The cruise control system according to claim 1, wherein the vehicle data relates to at least one of the velocity of the vehicle, a yaw velocity of the vehicle, and a lateral acceleration of the vehicle.

4. The cruise control system according to claim 1, wherein the vehicle has an engine, a transmission and a brake system and the velocity of the vehicle is regulated by controlling an operation of at least one of the engine, the transmission and the brake system.

5. The cruise control system according to claim 1, wherein said variable $f_T$ is a number that is increased if an observed object detected in a current measurement cycle is assigned to the object which has already been detected.

6. The cruise control system according to claim 1, wherein said variable $f_A$ is greater the smaller the fluctuations of sensor measurement signals of the object are between successive measurement cycles.

7. The cruise control system according to claim 1, wherein said variable $f_D$ is greater the smaller a deviation between the distance determined from the object and a distance which is to be expected in terms of criteria due to dynamics of vehicle movement.

8. The cruise control system according to claim 1, wherein said variable $f_V$ is greater the smaller a deviation between the relative velocity determined between the vehicle and the object and a relative velocity which is to be expected in terms of criteria of dynamics of vehicle movement.

9. The cruise control system according to claim 1, wherein said variable $f_W$ is greater the smaller a deviation between a first angle determined between the direction of travel of the vehicle and a direction of the vehicle with respect to the object and a second angle which is to be expected in terms of criteria of dynamics of vehicle movement.

10. The cruise control system according to claim 1, wherein said variable $f_P$ is a location probability and is determined by a current angle between the direction of travel of the vehicle and the direction of travel of the vehicle with respect to the object, a path of the vehicle and an expected path of the object, and said variable $f_P$ is greater the greater an associated probability.

11. The cruise control system according to claim 1, wherein said tracking probability P is determined by an equation being:

$$P = w_T * f_T + w_A * f_A + w_D * f_D + w_V * f_V + w_W * f_W + w_P * f_P,$$

where $w_T$, $w_A$, $w_D$, $w_V$, $w_W$ and $w_P$ are weighting factors resulting from a relative significance of a quality of individual measurement results.

* * * * *